United States Patent [19]
Clark

[11] Patent Number: 5,376,396
[45] Date of Patent: Dec. 27, 1994

[54] BEVERAGE STABILIZING SYSTEM AND PROCESS THEREOF

[75] Inventor: Ross C. Clark, San Diego, Calif.

[73] Assignee: Merck & Co., Inc., Rahway, N.J.

[21] Appl. No.: 53,574

[22] Filed: Apr. 27, 1993

[51] Int. Cl.[5] ...................... A23L 1/054; A23L 1/0532
[52] U.S. Cl. .................................. 426/573; 426/330.3; 426/330.5; 426/575; 426/590; 426/593; 426/599
[58] Field of Search ............... 426/573, 590, 593, 599, 426/330.3, 330.5, 575

[56] References Cited

U.S. PATENT DOCUMENTS

| | | | |
|---|---|---|---|
| 3,619,205 | 11/1971 | LeVan | 426/590 |
| 3,736,149 | 5/1973 | Knapp | 426/590 |
| 4,326,052 | 4/1982 | Kang et al. | |
| 4,326,053 | 4/1982 | Kang et al. | |
| 4,503,084 | 3/1985 | Baird et al. | 426/573 |
| 4,980,193 | 12/1990 | Tuason, Jr. et al. | |

OTHER PUBLICATIONS

Developmental Product Bulletin RC-180, Kelco Polymers in Beverage Products, pp. 1-8.

Primary Examiner—Helen Pratt
Attorney, Agent, or Firm—Richard S. Parr; Melvin Winokur; Paul D. Matukaitis

[57] ABSTRACT

A beverage stabilizing system which is a blend of gellan gum and carboxymethylcellulose. The blend provides a weak, stabilizing gel structure suitable for beverage products.

13 Claims, 3 Drawing Sheets

BEVERAGE STABILIZING SYSTEM AND PROCESS THEREOF

BACKGROUND OF THE INVENTION

Many commercially available beverages are unstable and require stabilizing additives to maintain beverage homogeneity over an extended period of time. Citrus juices, for example, contain pulp material which remain suspended over a period of time only with the assistance of additives such as propylene glycol alginates or other food additives known to stabilize and/or thicken. Beverages containing powder additives such as cocoa powder also require suspending agents to prevent premature settling.

In the past, hydrocolloids such as gum arabic, xanthan gum, pectin, starch and modified starch, and carboxymethylcellulose have been used to stabilize beverages. Relatively large quantities of these materials are required in order to achieve an effective degree of stabilization. While stabilizing the beverage, these materials unfortunately affect beverage flavor and feel. Sometimes, as with xanthan gum, the beverage stabilizing material reacts with other beverage components, including proteins (such as milk proteins or beer proteins), affecting beverage flavor and stabilizer efficacy.

McGinley, et al., U.S. Pat. No. 4,980,193, describes a stabilizing agent which is useful as a rapid dispersing agent for suspending solids in an aqueous medium, which contains colloidal microcrystalline cellulose, starch, and a non-thickening water soluble diluent such as maltodextrin, whey or non-fat dry milk.

The present invention is a beverage stabilizing system which forms a weak, stabilizing gel structure particularly suitable for beverage stabilization.

SUMMARY OF THE INVENTION

The invention is a beverage stabilizing blend composition consisting of carboxymethylcellulose and gellan gum in the carboxymethylcellulose:gellan gum weight ratio range of between about 3:1 to 20:1, preferably 4:1 to 15:1, and more preferably 5:1 to 10:1. The invention also includes beverages containing the beverage stabilizing blend.

The amount of stabilizing blend used in the beverages, based on weight % of the beverage, is between about 0.06% and 0.3%, preferably 0.06% and 0.2%, and more preferably 0.06% and 0.1%.

In some beverages, it is advantageous, although not necessary, to include, in the stabilizing blend, an amount of propylene glycol alginate. Thus, the invention contemplates preferred beverage stabilizing blends which include carboxymethylcellulose, gellan gum, and propylene glycol alginate, as well as beverages containing these beverage stabilizing blends. These blends can include amounts of propylene glycol alginate up to and equivalent to the amounts of carboxymethylcellulose. The propylene glycol alginate:gellan gum weight ratio is between about 3:1 to 20:1, preferably 4:1 to 15:1, and more preferably 5:1 to 10:1.

The invention also includes a method for stabilizing a beverage which comprises adding to the beverage a stabilizing blend composition consisting of carboxymethylcellulose and gellan gum in the carboxymethylcellulose:gellan gum weight ratio range of between about 3:1 to 20:1.

DETAILED DESCRIPTION OF THE INVENTION

Figure 1:
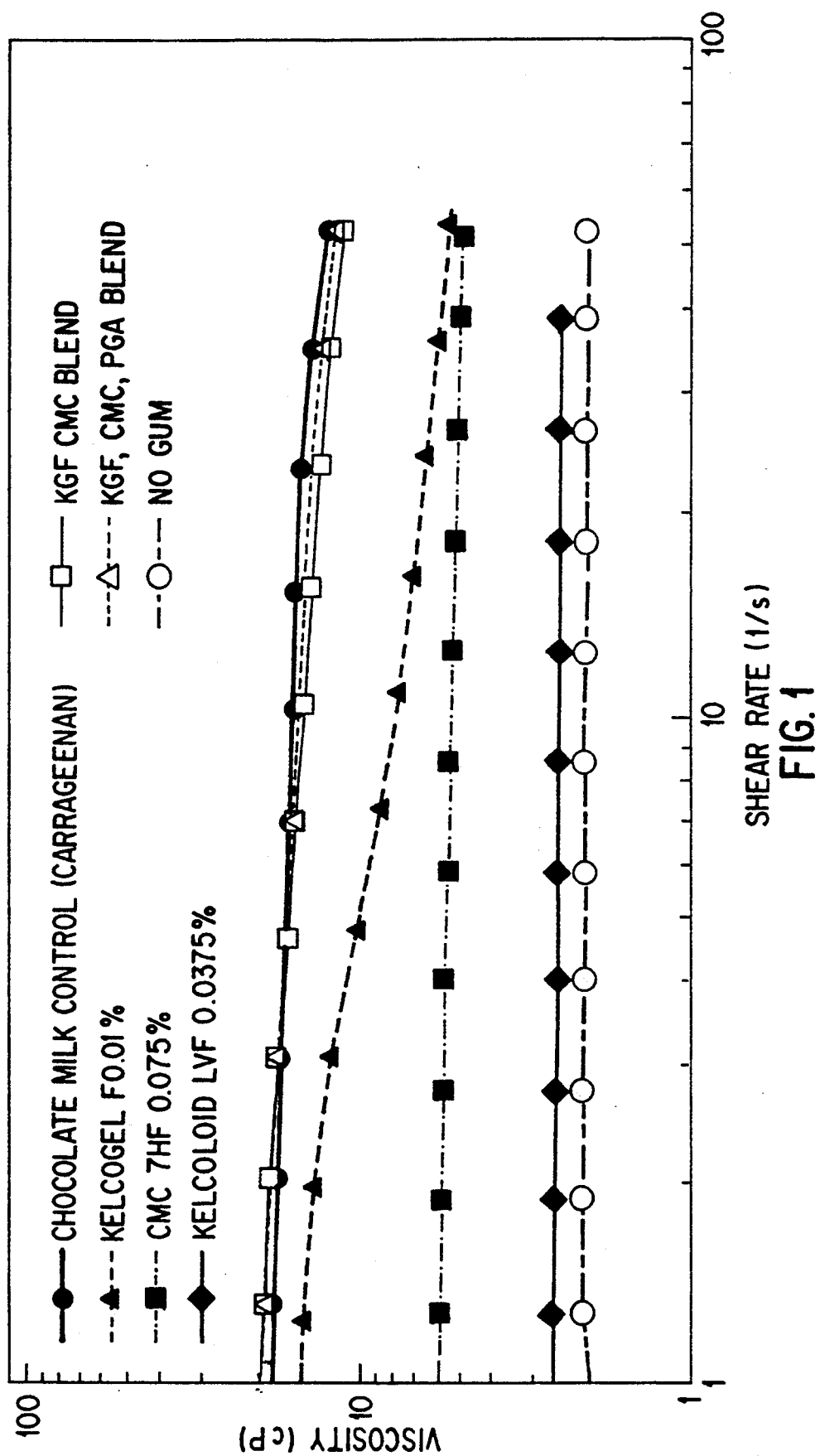
FIG. 1 shows viscosity of low fat milk as a function of stabilizer type.

The beverage stabilizing blend composition of the present invention provides a unique gel structure which is particularly suited for beverages. The gel structure provides a system which suspends materials, such as solid powder materials or solid pulp materials, that are present in beverages and that otherwise separate from the beverage over time. Advantageously, the gel is weak and breaks under low shear conditions, allowing convenient consumption of the beverage. Thus the stabilizing blends of the invention acheive the objectives of maintaining beverage homogeneity and providing low viscosity at moderate shear conditions.

The combination of gellan gum and carboxymethylcellulose provides a uniquely effective stabilizing system that cannot be effected with gellan gum or carboxymethylcellulose alone.

Beverages containing blends of the invention display rheological properties of a weak gel system when measured using dynamic viscoelastic measurements. One characteristic of a gelled system is a constant elastic (storage) modulus over a range of strain values up to a critical strain value, at which critical strain value the modulus drops significantly.

In beverage systems, gel networks created by gellan gum alone are susceptible to breakdown even at low levels of shear strain. Gentle stirring can result in complete loss of suspending abilities. The gel is so delicate that it can only be detected through the use of sensitive instrumentation.

The addition of carboxymethylcellulose to gellan gum provides an effective beverage stabilizing system. Indications are that CMC, and other materials with a similar $\beta 1 \rightarrow 4$ backbone, can modify gellan gum gel formation behavior. In beverages, where low levels of gellan gum are used, this combination with CMC results in a product that is much less sensitive to strain, has gel properties that are able to re-form with time and imparts a greater viscous modulus. All of these are important for product stability and mouthfeel.

In some instances, the addition of propylene glycol alginate enhances the beverages stabilized by gellan gum and CMC. PGA imparts flavor benefits which have been quantified with extensive sensory testing. It also adds to the background of "plain" or non-gelled viscosity that helps give a smooth feeling in the mouth. Thus, stabilizing systems which also include polyethylene glycol alginate are preferred stabilizing systems.

Beverages which are stabilized by blends of the invention include pulp-containing, oil emulsion-containing or other particle-containing beverages, including citrus juices such as orange juice, fruit nectars, and milk-based beverages such as chocolate milk.

Gellan gum is a heteropolysaccharide prepared by fermentation of *Pseudomonas elodea* ATCC 31461. Gellan gum is available from Kelco Division of Merck & Co., Inc., under various names, including KELCOGEL, KELCOGEL PC, and KELCOGEL F. Processes for preparing gellan gum include those described in U.S. Pat. Nos. 4,326,052 and 4,326,053. It is useful for a variety of gelling, texturizing, stabilizing and film forming applications, particularly as a gelling agent in foods, personal care products and industrial applications. KELCOGEL PC consists of 80% KELCOGEL F fine mesh gellan gum and 20% fine mesh sodium citrate.

Carboxymethylcellulose, e.g. CMC 7HF, is a cellulose derivative which is commercially available and known to be useful in drilling muds, as a soil-suspending agent in detergents, in resin emulsion paints, adhesives, printing inks, textile sizes, and as a food stabilizer.

Propylene glycol alginates are water-soluble, hydrophilic colloids used as secondary emulsifiers to thicken and stabilize food and pharmaceutical systems. They provide a range of viscosities from very low to very high, depending on type and concentration. These alginates combine emulsifying and thickening properties to provide excellent emulsion stability with good body. Propylene glycol alginates are useful in acidic solutions, since they are soluble and stable in solutions of pH 3.0 to 6.0. Specific food applications include syrups, sauces, icings, frozen foods, salad dressings, relish, batters, citrus concentrates and food emulsions. Propylene glycol alginates are commercially available from Kelco, Division of Merck & Co., Inc., San Diego, Calif., under product names KELCOLOID® HVF, KELCOLOID® LVF, KELCOLOID® DH, KELCOLOID® S, and KELCOLOID® O.

Typical pH modifiers, such as citric acid or maleic acid, sweeteners, such as natural and artificial sweeteners, preservatives, such as sodium benzoate, flavorings such as flavor emulsion oil bases, other common beverage additives such as sodium citrate and ascorbic acid, and colorings, may also be added to beverages of the present invention KELCOGEL PC gellan gum (80% fine mesh gellan gum KELCOGEL F and 20% fine mesh sodium citrate) was used in the following examples. The presence of sodium citrate improves the solubility of the gellan gum by sequestering divalent ions present in the system. CMC 7HF (Aqualon) and KELCOLOID LVF propylene glycol alginate were also used.

EXAMPLE 1

Stabilized Chocolate Milk

Commercially available Alta Dena low fat chocolate milk, which contains κ-carrageenan, was examined using the Vilastic V-E rheometer. Specifically, elastic modulus and viscous modulus were measured.

A basic low fat chocolate milk formulation containing 6.3% sugar and 1.0% alkalized low fat cocoa powder type S from Cacao De Zaan (Holland), was stabilized with the beverage stabilizing system of the invention. The stabilizer blend was thoroughly mixed with the sugar and cocoa powder and added directly to the cold milk before heating the product. The final formulation and procedures are given below:

| Chocolate Milk Formulation | Quantity | |
|---|---|---|
| Ingredients | Grams | Percent |
| Non fat milk | 370.3 | 92.575 |
| Sugar | 25.2 | 6.30 |
| Cocoa powder | 4.0 | 1.00 |
| Carboxymethylcellulose CMC 7HF | 0.30 | 0.075 |
| KELCOLOID LVF | 0.15 | 0.0375 |
| KELCOGEL PC gellan gum | 0.05 | 0.0125 |
| Total | 400.0 | 100.00 |

Procedure

1. Thoroughly blend the sugar, cocoa powder, CMC, KELCOLOID LVF and KELCOGEL PC and disperse them with good agitation into the cold milk.
2. Heat the milk to 71° C. (160° F.). Maintain this temperature for several minutes while mixing.
3. Rapidly cool the mixture while stirring.
4. Package and store under refrigerated conditions.

Shear rate of 50 s$^{-1}$ was used as a standard rate to evaluate the behavior of beverages containing various blends. 50 s$^{-1}$ is used as a standard because it has been found to closely represent mouth shear conditions.

A blend of 7.5 parts CMC (0.075% wt. based on total beverage weight) to 1 part KELCOGEL PC gellan gum (0.0125% wt. based on total beverage weight) was evaluated for beverage stabilization. The KELCOLOID LVF was present at 0.0375% wt. based on total beverage weight. This blend formed a beverage product having good rheology and mouthfeel.

FIG. 1 compares viscosities of milk based beverages containing one of the stabilizing blend components with the viscosity of a milk based beverage containing the stabilizing blend of the invention. Also represented is a commercially available low fat chocolate milk product containing carrageenan, and a milk based beverage containing none of the components of the stabilizing blend.

Figure 2:
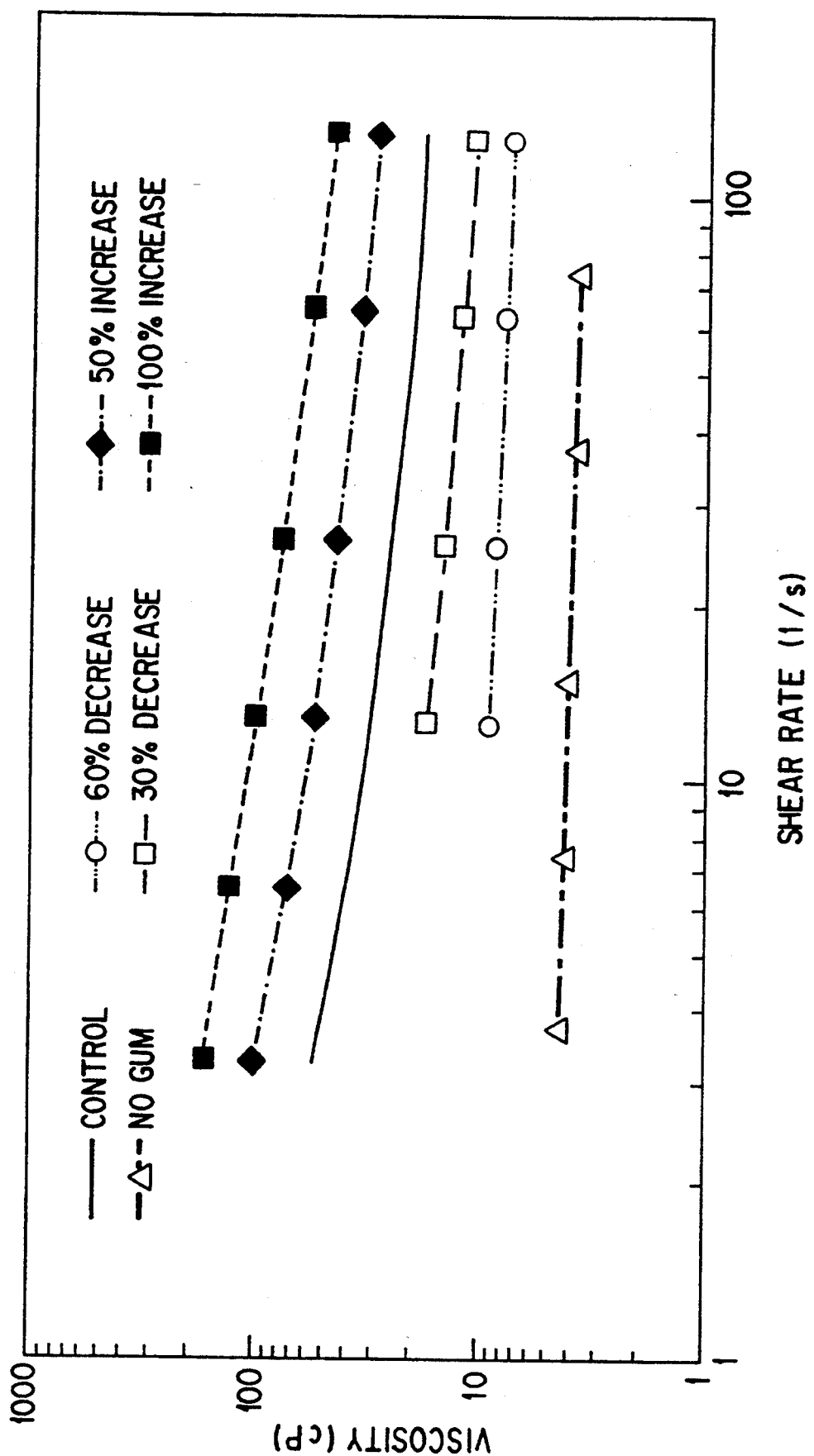
FIG. 2 shows viscosity of chocolate milk as a function of stabilizer concentration.

The CMC/KELCOGEL PC blend both with and without PGA produced viscosities equal to the commercial chocolate milk. Stability tests found both blends are able to suspend the cocoa powder for 7 days, while the individual components began to separate after being stored for only 24 hours at refrigerated temperatures (~4° C.). Stabilizer level was varied to identify suitable ranges. The "control" beverage contained 0.075% CMC, 0.0375% KELCOLOID LVF and 0.0125% KELCOGEL PC (i.e. 0.1125% total stabilizer blend). Levels of these blend components were increased or decreased uniformly. The viscosities of these various milk based beverages are shown in FIG. 2.

Results showed that the gum stabilizer blend would form a strong, uniform gel at a 100% increase in concentration (i.e. 0.15% CMC, 0.075% KELCOLOID LVF and 0.025% KELCOGEL PC, corresponding to 0.25% total stabilizer blend). The control beverage, as well as beverages with 50% and 100% increased levels of stabilizer blend, displayed no signs of separation. Beverages with 30% and 60% decreased levels of stabilizer displayed separation of the cocoa after 24 hours at refrigerated temperatures.

EXAMPLE 2

Peach Nectar

A peach nectar produced by Kerns was evaluated for soluble solids (14.2% solids), pH (3.7) and viscosity. Because of the pulp present in the peach nectar, a Brookfield RVT with a UL adapter, rather than the Vilastic V-E was used for viscosity determinations. The viscosity at a shear rate of 50 s$^{-1}$ was 32 cP @ 6° C.

The ingredient statement for the Kerns product along with the solids, pH and viscosity were used to develop a nectar formulation

| Peach Nectar Formulation | Quantity | |
|---|---|---|
| Ingredients | Grams | Percent |
| Water deionized | 187.42 | 62.47 |
| Peach pulp puree | 63.00 | 21.0 |
| High fructose corn syrup 55DE | 48.00 | 16.0 |
| Citric acid | 0.73 | 0.24 |
| Sodium Citrate | 0.40 | 0.13 |
| Carboxymethylcellulose CMC 7HF | 0.15 | 0.05 |
| KELCOLOID LVF | 0.15 | 0.05 |
| Ascorbic acid | 0.12 | 0.04 |
| KELCOGEL PC gellan gum | 0.03 | 0.01 |
| Total | 300.0 | 100.00 |

Procedure
1. Blend the CMC, KELCOLOID LVF and the KELCOGEL PC together and add to the deionized water while mixing under high shear. Mix for 5 minutes.
2. Add the corn syrup to the gum solution and continue mixing for 2 more minutes.
3. Blend the citric acid, sodium citrate and ascorbic acid together. Mix this blend into the peach puree.
4. Add the peach puree to the gum corn syrup solution and mix for 3 minutes.
5. Bottle and store nectar under refrigerated conditions.

Peach puree was obtained by blending canned cling peaches in a food processor. The corn syrup used was 55 DE high fructose corn syrup produced by Staley. The levels of citric acid and corn syrup were chosen to match the solids and pH of the Kerns product. Ascorbic acid was added to slow oxidation discoloration of the product.

A viscosity of about 32 cP at 50 s$^{-1}$ @ 6° C. is desirable for a peach nectar beverage.

Five parts CMC to 1 part KELCOGEL PC was used to stabilize the nectar. KELCOLOID LVF was used at a level equal to the CMC for background viscosity and flavor enhancement. No heating was required.

Figure 3:
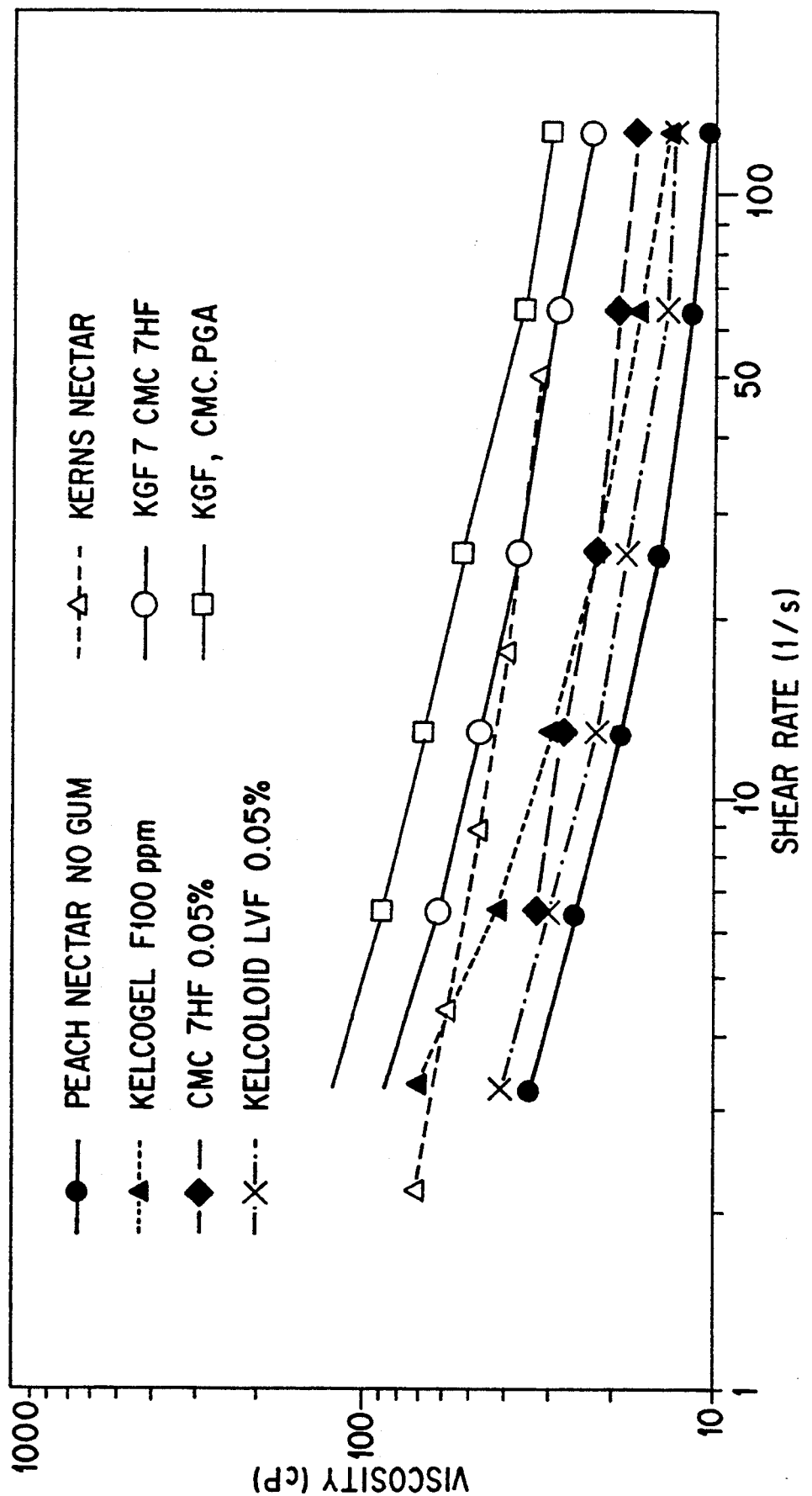
FIG. 3 shows viscosity of peach nectar as a function of stabilizer type.

When the blend was used at 0.11% total concentration, a viscosity of 35 cP at 50$^{-1}$ and 6° C. resulted. Viscosity of the beverage, as a function of shear rate, is shown in FIG. 3.

Procedure
1. Blend the CMC, KELCOLOID LVF and the KELCOGEL PC together and add to the deionized water while mixing under high shear. Mix for 5 minutes.
2. Add the corn syrup to the gum solution and continue mixing for 2 more minutes.
3. Blend the citric acid, sodium citrate and ascorbic acid together. Mix this blend into the peach puree.
4. Add the peach puree to the gum corn syrup solution and mix for 3 minutes.
5. Bottle and store nectar under refrigerated conditions.

Peach puree was obtained by blending canned cling peaches in a food processor. The corn syrup used was 55 DE high fructose corn syrup produced by Staley. The levels of citric acid and corn syrup were chosen to match the solids and pH of the Kerns product. Ascorbic acid was added to slow oxidation discoloration of the product.

A viscosity of about 32 cP at 50 s$^{-1}$ @ 6° C. is desirable for a peach nectar beverage.

Five pans CMC to 1 part KELCOGEL PC was used to stabilize the nectar. KELCOLOID LVF was used at a level equal to the CMC for background viscosity and flavor enhancement. No heating was required.

When the blend was used at 0.11% total concentration, a viscosity of 35 cP at 50$^{-1}$ and 6° C. resulted. Viscosity of the beverage, as a function of shear rate, is shown in FIG. 3.

Significant settling (>20%) was observed in the control with no stabilizer component, as well its tile samples containing either CMC alone or KELCOLOID LVF alone. Approximately 2% settling was measured in the nectar containing KELCOGEL PC alone. Gellan gum alone does not provide enough structure to prevent settling.

After 100 hours, no settling was observed in the beverage containing the blend of KELCOGEL PC and CMC. Also, after 100 hours, no settling was observed in the beverage containing the blend of KELCOGEL PC/CMC/PGA.

EXAMPLE 3

| Citrus Punch Formulation | Quantity | |
|---|---|---|
| Ingredients | Grams | Percent |
| Water deionized | 381.091 | 76.2182 |
| High fructose corn syrup 55DE | 64.40 | 12.8800 |
| Citrus Juice Concentrate | 50.00 | 10.0000 |
| Citric acid | 3.03 | 0.6060 |
| Sodium Citrate | 0.79 | 0.1580 |
| Carboxymethylcellulose CMC 7HF | 0.24 | 0.0480 |
| Concentrated Orange Flavor | 0.115 | 0.0230 |
| Ascorbic acid | 0.19 | 0.0380 |
| KELCOLOID LVF | 0.12 | 0.0240 |
| KELCOGEL PC gellan gum | 0.024 | 0.0048 |
| Total | 500.0 | 100.000 |

Procedure
1. Dry blend the CMC, KELCOLOID LVF and the KELCOGEL PC together and add to the deionized water while mixing under high shear. Mix for 5 minutes.
2. Add the corn syrup to the gum solution and continue mixing for 2 more minutes.
3. Add the concentrated orange flavor to the solution and mix for 1 minute.
4. Blend the citric acid, sodium citrate and ascorbic acid together. Mix this blend into the citrus juice concentrate.
5. Add the citrus concentrate to the gum corn syrup solution and mix for 3 minutes.
6. Bottle and store under refrigerated conditions.

This beverage, containing gellan gum, CMC and PGA, demonstrated good stability.

I claim:
1. A beverage stabilizing blend composition comprising carboxymethylcellulose and gellan gum in a carboxymethylcellulose:gellan gum weight ratio range of between about 3:1 to 20:1.
2. A beverage stabilizing blend composition of claim 1 comprising carboxymethylcellulose and gellan gum in a carboxymethylcellulose:gellan gum weight ratio range of between about 4:1 to 15:1.
3. A beverage stabilizing blend composition of claim 2 comprising carboxymethylcellulose and gellan gum in a carboxymethylcellulose:gellan gum weight ratio range of between about 5:1 to 10:1.

4. A beverage stabilizing blend composition of claim 1 comprising carboxymethylcellulose, gellan gum, and propylene glycol alginate, wherein the weight ratio of propylene glycol alginate:gellan gum is in the range of between about 3:1 to 20:1.

5. A beverage stabilizing blend composition of claim 4 comprising carboxymethylcellulose, gellan gum, and propylene glycol alginate, wherein the weight ratio of propylene glycol alginate:gellan gum is in the range of between about 4:1 to 15:1.

6. A beverage stabilizing blend composition of claim 5 comprising carboxymethylcellulose, gellan gum, and propylene glycol alginate, wherein the weight ratio of propylene glycol alginate:gellan gum is in the range of between about 5:1 to 10:1.

7. A beverage composition comprising between about 0.06% and 0.3% beverage stabilizing blend of claim 1.

8. A beverage composition comprising between about 0.06% and 0.3% beverage stabilizing blend of claim 2.

9. A beverage composition comprising between about 0.06% and 0.3% beverage stabilizing blend of claim 3.

10. A beverage composition comprising between about 0.06% and 0.3% beverage stabilizing blend of claim 4.

11. A beverage composition comprising between about 0.06% and 0.3% beverage stabilizing blend of claim 5.

12. A beverage composition comprising between about 0.06% and 0.3% beverage stabilizing blend of claim 6.

13. A method for stabilizing a beverage which comprises adding to the beverage a stabilizing blend composition comprising carboxymethylcellulose anti gellan gum in a carboxymethylcellulose:gellan gum weight ratio range of between about 3:1 to 20:1.

* * * * *